Figure 1:
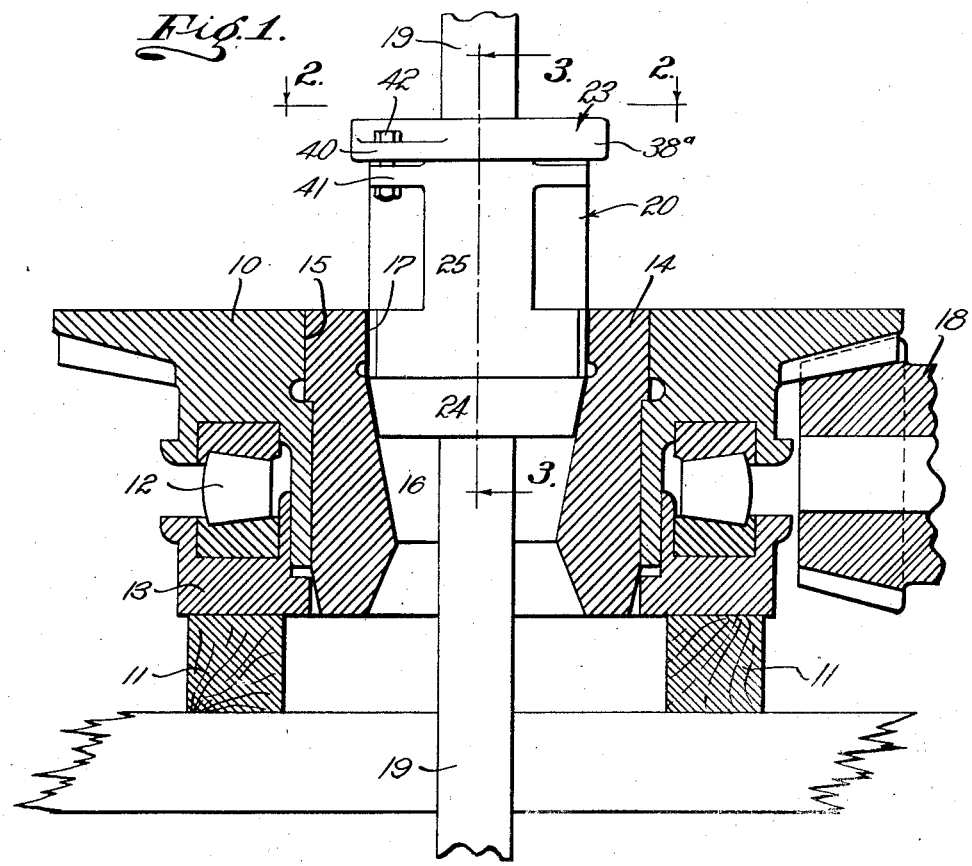

March 21, 1933.    W. A. VOCK    1,902,600
BUSHING
Filed Oct. 5, 1931    2 Sheets-Sheet 1

Inventor
William A. Vock
By  [signature]
His Attorney

March 21, 1933.   W. A. VOCK   1,902,600
BUSHING
Filed Oct. 5, 1931   2 Sheets-Sheet 2
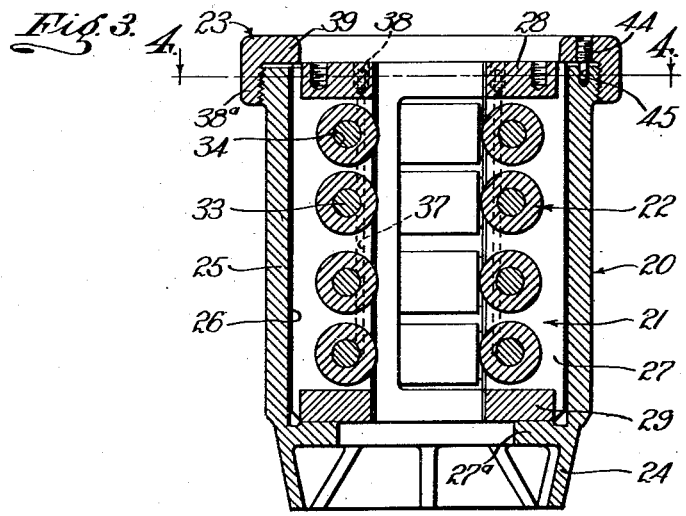
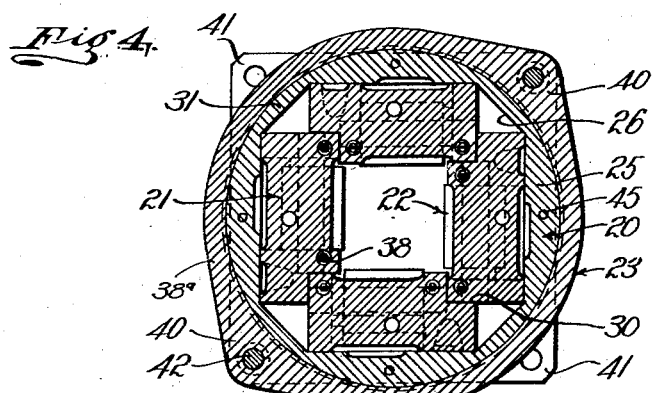
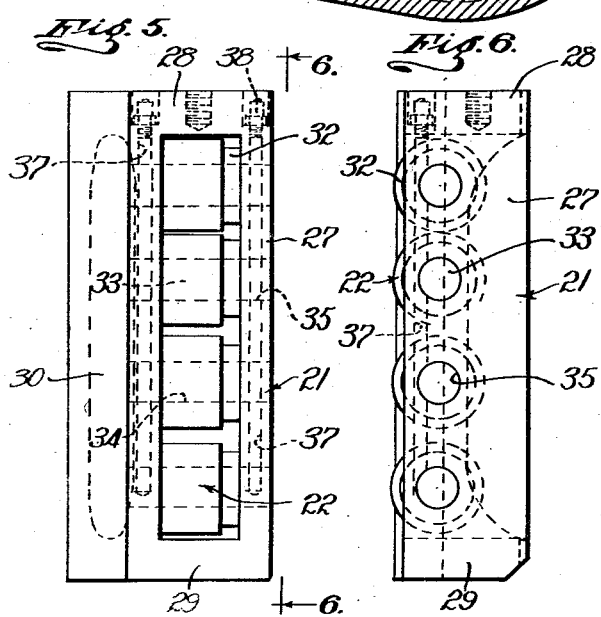
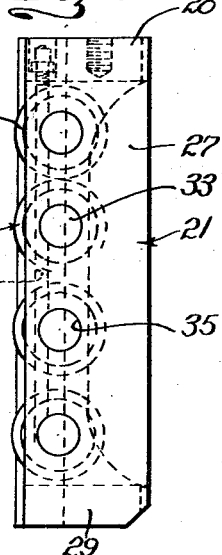
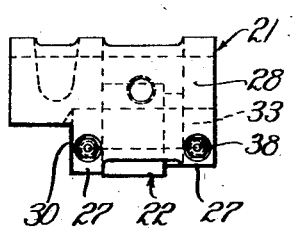
Inventor
William A. Vock
By His Attorney Patented Mar. 21, 1933

1,902,600

UNITED STATES PATENT OFFICE

WILLIAM A. VOCK, OF LONG BEACH, CALIFORNIA

BUSHING

Application filed October 5, 1931. Serial No. 566,992.

This invention relates to a bushing, and relates more particularly to a bushing for use in the rotary table of a rotary well drilling outfit. It is a general object of the present invention to provide an improved rotary table bushing of the general type involving rotatable members or rollers for engaging a drill stem.

In the rotary method of well drilling, rotary units or rotary tables are provided to drive or rotate the drilling string through suitable bushings. A grief stem or drill stem is provided in the drilling string for engagement by the bushing in the rotary table. The engagement between the bushing carried in the rotary table and the drill stem is such that the drill stem may be raised or lowered through the table while the driving or rotative engagement is maintained between the rotary table and the drill stem. Considerable friction and wear occurs between the drill stem and the bushing of the rotary table. Bushings involving rollers or rotatable members for engaging the drill stem have been introduced to lessen the wear and friction between the drill stem and the table and to provide for smoother operation of the drill stem. This type of rotary table bushing involves rollers or rotatable members that are adapted to bear against the drill stem. The rollers are usually rotatable about horizontal axes and are equally spaced apart vertically to engage the drill stem at longitudinally spaced points. In the actual employment of rotary table bushings of the character mentioned, the excessive pressural engagement between the bushings and the drill stem often causes the rollers to make series of impressions or corrugations in the drill stem. This corrugation of the drill stem is due principally to the uniform spacing of the rollers which spacing causes the rollers to track one after the other in equally spaced impressions or indentations which they form in the drill stem during the vertical feeding of the drill stem. The continued engagement of the rollers in the spaced impressions or indentations in the drill stem enlarges the indentations and causes a certain amount of looseness to develop between the bushing and the drill stem so that the driving engagement of the bushing with the drill stem occurs principally at one side or face of the stem. In actual practice the driving pressures on one side of the drill stem sometimes cause the stem to be bent or warped and often produce a twist in the stem.

Another object of the present invention is to provide a rotary table bushing that is adapted to effectively drive a drill stem without marring, twisting, or in any manner distorting the drill stem.

Another object of the present invention is to provide a rotary table bushing having rotatable members for engaging the drill stem which members are so related so as to not form material impressions or indentations in the drill stem.

Another object of the invention is to provide a rotary table bushing of the character mentioned in which the driving pressures on the drill stem are equal at all sides of the drill stem so that the stem does not tend to warp or twist.

Another object of the invention is to provide a rotary table bushing that includes a plurality of rotatable members for engaging a drill stem that are spaced apart and related so that they cannot track one after the other in their engagement with the stem during vertical feeding of the drill stem through the bushing.

Another object of the invention is to provide a rotary table bushing of the character mentioned in which the rotatable members for engaging the drill stem are effectively mounted and held against displacement in a simple manner without the use of complicated or delicate parts.

A further object of the invention is to provide a rotary table bushing of the general character mentioned in which the rotatable members or rollers are carried in removable cages locked or retained in the body of the bushing in a simple effective manner.

Figure 2:
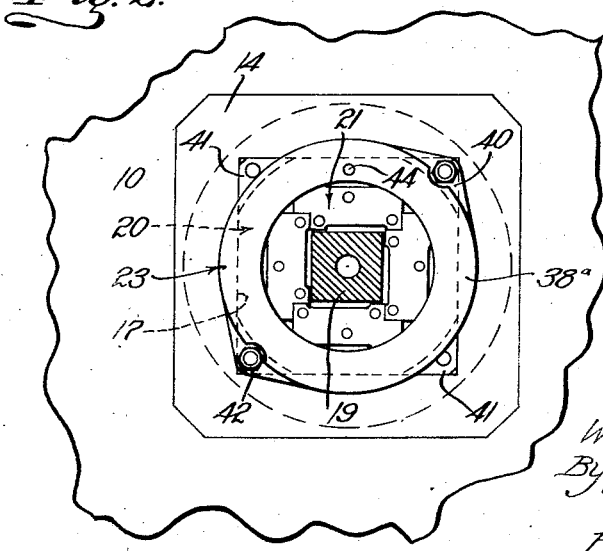

Other objects and features of the invention will be best and more fully understood from the following detailed description of a typical form and application of the invention, throughout which description reference will be had to the accompanying drawings, in which:

Fig. 1 is a side elevation of the bushing provided by the present invention, illustrating it mounted in a typical rotary table and engaging a typical drill stem, being a view showing the rotary table in vertical section. Fig. 2 is a top or plan view of the bushing, being a view taken as indicated by line 2—2 on Fig. 1. Fig. 3 is an enlarged vertical detailed sectional view of the bushing taken as indicated by line 3—3 on Fig. 1, illustrating one manner of relating or spacing the rollers. Fig. 4 is a horizontal detailed sectional view taken as indicated by line 4—4 on Fig. 3. Fig. 5 is a side elevation of one of the roller carrying cages included in the bushing, illustrating another typical manner of spacing the rollers. Fig. 6 is an end elevation of the cage, being a view taken as indicated by line 6—6 on Fig. 5, and Fig. 7 is a top or plan view of the cage.

The bushing device provided by this invention is intended primarily for use in the standard or common types of rotary tables employed in the rotary method of well drilling. The bushing is adapted to be mounted in the table to engage and drive a kelly or drill stem. Throughout the following detailed description the invention will be disclosed in a form for use in a typical rotary table and for engaging a typical drill stem or square horizontal cross section. It is to be understood that modifications and changes may be made in the bushing to adapt it for use in connection with various classes and types of well drilling equipment without departing from the spirit of the invention.

The typical rotary unit illustrated in the drawings includes a rotary table 10 rotatably supported on skids 11 through a bearing 12, and a race or support 13. A master bushing 14 is mounted within the opening 15 of the rotary table and is held against rotative movement relative to the table. The opening in the master bushing 14 has a downwardly and inwardly tapered lower portion 16 of round cross section and a polygonal portion 17 immediately above the tapered portion 16. The rotary table 10 is adapted to be driven or rotated by a bevel gear 18 in the usual manner.

The improved bushing provided by this invention is adapted to be arranged in the opening of the master bushing 14 to establish or provide a driving connection between the rotary table and a drill stem or kelly 19. The bushing of this invention includes, generally, a body 20 adapted to be held in the opening of the master bushing 14, a plurality of carriers or cages 21 in the body 20, rotatable members 22 mounted in the cages 21 for engaging the drill stem 19, and means 23 for retaining the cages 21 in the body.

The body 20 is provided to carry the roller carrying cages 21 and is shaped to effectively fit the opening of the master bushing 14. A tapered portion 24 of round cross section is provided at the lower end of the body to fit the tapered portion 16 of the master bushing opening, and a main body portion 25 of polygonal cross section is provided immediately about the tapered portion 24 to fit the polygonal opening part 17. In the particular case illustrated in the drawings, the polygonal opening 17 and the main body part 25 are of substantially square horizontal cross section. The main portion 25 of the body is preferably of considerable length to accommodate comparatively large cages 21 and may project some distance above the upper surface of the rotary table. A central vertical opening 26 is provided in the body 20 to pass the drill stem 19 and to carry the cages 21. The opening 26 extends completely through the body 20 and is such that the roller carrying cages 21 may be passed into the body from its upper end. Where the bushing is to be employed in connection with a drill stem of square cross section, four cages 21 are provided, and the opening 26 has four flat vertical walls to support the cages. An upwardly-facing stop 27a is provided adjacent the lower end of the opening 26 to support the cages 21 in the opening and limit their downward movement.

The cages 21 are in the nature of frames or carriers for mounting the rollers 22 in position to engage the drill stem 19. In the present embodiment of the invention there are four like cages 21 of substantially rectangular configuration to fit or bear against the four walls of the opening 26. Each cage 21 has spaced vertical parallel sides or ends 27 connected by an upper end 28 and a lower end 29. The lower ends 29 of the several cages 21 are adapted to rest on the stop 27a, and the cages are proportioned so that their upper ends project slightly above the upper end of the body 20. In the preferred construction the several cages 21 interfit or mesh one with another so that they are held in their proper positions against the walls of the body opening 26. A vertical recess 30 is provided in a corner of each cage to receive the corner portion of an adjoining cage. Beveled or diagonal portions 31 are provided in the corners of the body opening 26 to strengthen the body and to aid in properly positioning the cages 21.

The rotatable members or rollers 22 are mounted in the cages 21 so as to engage the drill stem 19. The rollers 22 are horizontally disposed in the cages 21 and project from the inner sides of the cages to have bearing or driving engagement with the drill stem. In accordance with the invention, there are a plurality of rollers 22 carried in vertical alignment by each of the cages 21. The rollers 22 are comparatively long to have long bearing engagement with the drill stem 19. In the embodiment of the invention disclosed in the drawings the rollers 22 extend the entire distance between the vertical sides or ends 27 of the cages. A reduced portion 32 is provided at an end of each of the several rollers 22 to allow for suitable clearance with the adjoining or meshing cages 21.

In the preferred construction the rollers 22 are mounted in the frames or cages 21 by pins 33. The rollers 22 are tubular, having central longitudinal openings 34 for passing the mounting pins 33. The pins 33 extend completely through the openings 34 to project from the opposite ends of the rollers. The opposite end portions of the pins 33 projecting from the rollers are rotatably carried in openings 35 in the spaced side or end parts 27 of the cages. The pins 33 may tightly fit the openings 34 of the rollers 22 and have their end portions freely rotatable in the openings 35. It is to be understood that the rollers 22 may be rotatable on the pins 33, if desired. The ends of the two adjoining cages 21 hold the pins 33 of each cage against displacement in both directions from the openings 34. This manner of positively retaining the pins 33 in their proper positions is clearly illustrated in Fig. 4 of the drawings. In assembling a cage 21, the rollers 22 are first positioned between the spaced end portions 27 of the cage and the pins 33 are forced through the openings 34 until their end portions are properly positioned in the openings 35.

The relative vertical positions or the vertical spacing of the several rollers 22 of each cage 21 is an important feature of the invention. The rollers 22 of each cage are related to one another or vertically spaced apart so that they will not track during vertical movement of the drill stem through the bushing, that is, they are related so that if the drill stem 19 assumes a position where any one of the rollers 22 is opposite or in engagement with a point on the drill stem that has been just previously engaged by another roller 22, the remaining rollers of the series will all be out of register with all of the other points on the stem just previously engaged by any of the rollers. In accordance with the broader principles of the invention, the vertical relationship of the rollers 22, whereby they will not track one after the other during the feeding of the drill stem through the bushing, may be varied considerably without departing from the spirit of the invention. In the relationship between the rollers 22 illustrated in Figs. 5 and 6 of the drawings, the vertical spacing of the series of rollers 22 of each cage increases progressively from one of the series of rollers toward the other end of the series, that is the spacing of the rollers increases progressively from the upper end of the series toward the lower end of the series. In the specific embodiments of the invention disclosed in the drawings the space or distance between any two adjoining rollers 22 is different from the pace between any other two adjoining rollers. In the case illustrated in Fig. 3 of the drawings, the space between the two adjoining central or intermediate rollers 22 is greater than that between any other two rollers, while the vertical space between the two lowermost rollers is greater than that between the two uppermost rollers. It is to be understood that the invention is not to be taken as limited or restricted to the specific relationships or vertical spacings of the rollers 22 just set forth, while Fig. 3 and Figs. 5 and 6 illustrate different typical arrangements of the rollers 22, it is to be understood that in other respects the structures are identical.

When the rollers 22 are related so that they will not track one after the other in their engagement with the drill stem 19 during vertical feeding of the stem, any one roller 22 coming into register with a point on the drill stem previously engaged by another roller of the series and indented through such engagement, will not bear against said indented point on the drill stem, as the other rollers 22 of the series, being out of register with the several other points of previous engagement, will take the thrust or driving strain. In this manner any slight indentations or corrugations that may be formed in the drill stem through engagement of the rollers 22 with the drill stem will not become enlarged during the feeding or advancement of the drill stem through the bushing. In practice, the rollers rotate and have rolling engagement with the drill stem during vertical feeding of the drill so that they cannot form impressions and so that they tend to flatten or smooth out any irregularities that may be present on the drill stem. As the rollers do not form ever increasing impressions in the drill stem, undesirable play and looseness does not develop between the bushing and the drill stem.

The invention provides means for lubricating the roller supporting pins 33. Vertical openings 37 are provided in the spaced end parts 27 of the cages to communicate with the pin carrying openings 35. Suitable grease gun fittings 38, or the like, may be provided at the upper ends of the opening 37 whereby the openings may be supplied with a suitable lubricant.

The means 23 for locking or retaining the cages 21 in the body opening 26 includes a single clamping device in the form of a ring 38a. The extreme upper end of the body 20 is of round cross section and is screw-threaded to receive the screw-threaded ring 23. An inwardly-projecting annular flange 39 is provided on the upper end of the ring 38a. The flange 39 extends over the upper end of the body 20 to project over and engage the upper ends of the several roller-carrying cages 21. The ring 38a in thus engaging the cages 21 is operable to hold them down in their proper positions in engagement with the stop 27. The flange 39 is proportioned so that it does not cover or interfere with free access to the lubricating fittings 38. The invention provides for the locking or setting of the ring 38a to prevent the ring from working loose. Lugs or ears 40 project horizontally outward from the ring 38a at diametrically opposite points. Similar ears 41 project outwardly from each of the four corners of the body 20. Removable bolts 42 are adapted to be arranged through vertical openings in the ears 40 and 41 to lock the ring 38a against turning on the body. A further ring locking means in the nature of a pin 44 carried by the ring 38a may be provided on the ring 38a to cooperate with any one of the plurality of sockets 45 in the upper end of the body 20. The pin 44 may be screw-threaded in an opening in the flange 39 to extend into any one of the sockets 45 to set or aid in setting the ring 38a against turning.

In employing the bushing device provided by this invention, it may be mounted in the rotary unit in the manner illustrated in Figs. 1 and 2 of the drawings. During operation, the rotary table 10 is rotated so that the rotative or driving strain is transmitted to the drill stem 19 through the bushing device. The several rollers 22 provide substantial bearing for effectively transmitting the driving pressure to the drill stem. The drill stem 19 may be moved or operated vertically during operation of the rotary unit, and the rollers 22, in being rotatable about horizontal axes, are effective in providing for the smooth, easy vertical movement of the drill stem through the bushing. As the rollers 22 are the only parts of the bushing device that engage the drill stem 19, the drill stem and drilling equipment may be operated in an effective manner without binding and without undue friction and wear between the drill stem and bushing. The several rollers 22 of each series carried by the cages 21 in being related or unequally spaced apart vertically in the manner described above, cannot track one after the other in their engagement with the drill stem during vertical feeding of the drill stem. Due to the unequal spacing of the rollers 22, material corrugations or impressions cannot be formed in the drill stem, and, accordingly, undue looseness or play does not develop between the drill stem and the bushing device. The rolling contact of the rollers with the drill stem maintains the vertical sides of the stem flat and smooth. As the drill stem 19 is engaged on all sides by the rollers 22, there is no tendency for the drill stem to warp or twist. The rollers 22 are mounted in simple, effective manners and may be properly lubricated.

In the event that it is desired to employ a kelly or drill stem of a different size, the removable roller-carrying cages 21 may be easily removed from the body 20, after the removal of the ring 38, and replaced by cages carrying rollers to properly cooperate with the desired size of drill stem. In this manner the body 20 may be employed to carry roller-carrying cages 22 for handling any desired size of drill stem. The retaining means 23 is simple and positive in operation and is such that the cages 21 may be easily and quickly replaced. Both the bolts 42 and the pin 45 are effective in locking the ring 38 in position and either or both may be used in holding the ring in position.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A bushing for use in a rotary table to form a drive between the table and a drill stem, which bushing includes a body to be carried by the table and having an opening for passing the drill stem, and a plurality of rotatable members mounted in the opening for engaging the drill stem, the said members being related vertically so that when during vertical movement of the drill stem one of the said members comes into register with one of the points on the drill stem previously engaged by one of the other members all of the said other members are out of register with the other points on the drill stem previously engaged by said other members.

2. A bushing for use in a rotary table to form a drive between the table and a drill stem, which bushing includes a body to be carried by the table and having an opening for passing the drill stem, and a plurality of rotatable members mounted in the opening in spaced vertical relation to rotate about horizontal axes for engaging the drill stem, the said members being related vertically so that when during vertical movement of the drill stem one of the said members comes into register with one of the points on the drill stem previously engaged by one of the other members all of the said other members are out of register with the other points on the drill stem previously engaged by said other member.

3. A bushing adapted to be carired by a rotary table to engage a drill stem, which bushing includes a body to be mounted on the rotary table and having an opening for passing the drill stem, and a plurality of series of rotatable rollers mounted in the opening for engaging the drill stem, the rollers of each series being spaced apart vertically and the vertical distances between the several rollers of a series being unequal.

4. A bushing adapted to be carried by a rotary table to engage a drill stem, which bushing includes a body to be mounted on the rotary table and having an opening for passing the drill stem, and a plurality of series of rotatable rollers mounted in the opening for engaging the drill stem, the rollers of each series being spaced apart vertically so that when during vertical movement of the drill stem one of the rollers of a series comes into register with one of the points on the drill stem previously engaged by one of the other rollers of the series all of the said other rollers of the series are out of register with the other points on the drill stem previously engaged by said other rollers.

5. A bushing adapted to be carried by a rotary table to engage a drill stem of polygonal horizontal cross section, which bushing includes a body to rotate with the rotary table and having an opening for passing the drill stem, a plurality of cages mounted in the opening of the body, and a series of rollers rotatably mounted in each cage to engage a side of the drill stem, the rollers of each series being spaced apart vertically so that when during vertical movement of the drill stem one of the rollers of a series comes into register with one of the points on the drill stem previously engaged by one of the other rollers of the series all of the said other rollers of the series are out of register with the other points on the drill stem previously engaged by said other rollers.

6. A bushing adapted to be carried by a rotary table to engage a drill stem of polygonal horizontal cross section, which bushing includes a body to rotate with the rotary table and having an opening for passing the drill stem, a plurality of cages removably mounted in the opening of the body, and a series of rollers rotatably mounted in each case to engage a side of the drill stem, the rollers of each series being spaced apart vertically so that when during vertical movement of the drill stem one of the rollers of a series comes into register with one of the points on the drill stem previously engaged by one of the other rollers of the series all of the said other rollers of the series are out of register with the other points on the drill stem previously engaged by said other rollers.

7. A bushing adapted to be carried by a rotary table to engage a drill stem of polygonal horizontal cross section, which bushing includes a body to rotate with the rotary table and having an opening for passing the drill stem, a plurality of cages mounted in the opening of the body, means for removably retaining the cages in the opening, and a series of rollers rotatably mounted in each cage to engage a side of the drill stem, the rollers of each series being spaced apart vertically so that when during vertical movement of the drill stem one of the rollers of a series comes into register with one of the points on the drill stem previously engaged by one of the other rollers of the series all of the said other rollers of the series are out of register with the other points on the drill stem previously engaged by said other rollers.

8. A bushing adapted to be carried by a rotary table to engage a drill stem of polygonal horizontal cross section, which bushing includes a body to rotate with the rotary table and having an opening for passing the drill stem, a plurality of cages mounted in the opening of the body, a series of rollers in each cage to engage a side of the drill stem, and pins carrying the rollers and rotatable in the cages about horizontal axes, the rollers of each series being spaced apart vertically so that when during vertical movement of the drill stem one of the rollers of a series comes into register with one of the points on the drill stem previously engaged by one of the other rollers of the series all of other rollers of the series are out of register with the other of said points on the drill stem previously engaged by said other rollers.

9. A bushing to be carried by a rotary table to engage a drill stem of polygonal horizontal cross section, which bushing includes a body to rotate with the rotary table and having an opening for passing the drill stem, a plurality of cages adapted to be arranged in the opening, means for retaining the cages in the opening including a ring screw threaded onto the body and adapted to engage the cages, lugs on the ring and body, and a removable member connecting the lugs, and a series of rollers carried by the cages for engaging the drill stem.

10. A bushing adapted to be carried by a rotary table to engage a drill stem of polygonal horizontal cross section, which bushing includes a body to rotate with the rotary table and having an opening for passing the drill stem, a plurality of cages adapted to be arranged in the opening, means for retaining the cages in the opening including a ring screw threaded onto the body and adapted to engage the cages, an ear on the ring, a plurality of circumferentially spaced ears on the body, and a bolt adapted to be passed through an opening in the first-mentioned ear and an opening in any one of the body ears, and a plurality of rollers carried by each cage to rotate about horizontal axes and adapted to engage the drill stem.

11. A bushing adapted to be carried by a rotary table to engage a drill stem of polygonal horizontal cross section, which bushing includes a body to rotate with the rotary table and having an opening for passing the drill stem, a plurality of cages adapted to be arranged in the opening, means for retaining the cages in the opening including a ring for engaging the cages, an ear on the ring, an ear on the body, and a removable locking member for connecting the said ears.

12. A bushing adapted to be carried by a rotary table to engage a drill stem of polygonal horizontal cross section, which bushing includes a body to rotate with the rotary table and having an opening for passing the drill stem, a plurality of cages adapted to be arranged in the opening, means for retaining the cages in the opening including a ring for engaging the upper ends of the cages, a projecting part on the body, a projecting part on the ring, and a removable member extending between said parts for holding the ring against upward movement.

13. A unit for use in a rotary table bushing having an opening for passing a drill stem, said unit including a cage to be mounted in said opening, and a plurality of rotatable rollers carried by the cage to engage the drill stem, the rollers being spaced apart vertically, the vertical distances between the several rollers being unequal.

In witness that I claim the foregoing I heve hereunto subscribed my name this 14 day of September, 1931.

WILLIAM A. VOCK.